(12) United States Patent
Morovic et al.

(10) Patent No.: US 12,275,234 B2
(45) Date of Patent: Apr. 15, 2025

(54) PRINTING MODES WITH DRYING DELAYS

(71) Applicant: Hewlett-Packard Development Company, L.P., Spring, TX (US)

(72) Inventors: Peter Morovic, Sant Cugat del Valles (ES); Jan Morovic, London (GB)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 139 days.

(21) Appl. No.: 18/249,763

(22) PCT Filed: Oct. 22, 2020

(86) PCT No.: PCT/US2020/056744
§ 371 (c)(1),
(2) Date: Apr. 20, 2023

(87) PCT Pub. No.: WO2022/086527
PCT Pub. Date: Apr. 28, 2022

(65) Prior Publication Data
US 2023/0382132 A1 Nov. 30, 2023

(51) Int. Cl.
*B41J 11/00* (2006.01)
*B41J 2/21* (2006.01)

(52) U.S. Cl.
CPC ....... *B41J 11/00212* (2021.01); *B41J 2/2103* (2013.01)

(58) Field of Classification Search
CPC .. B41J 11/00212; B41J 2/2103; B41J 11/002; B41J 2/2121; G01J 3/50; H04N 1/603; H04N 1/6091; H04N 1/6097
See application file for complete search history.

(56) References Cited

U.S. PATENT DOCUMENTS

| | | | |
|---|---|---|---|
| 5,714,990 A | 2/1998 | Courtney | |
| 6,193,345 B1 * | 2/2001 | Feinn | B41J 2/04595 347/12 |
| 8,416,459 B2 | 4/2013 | Ito et al. | |
| 8,882,228 B2 | 11/2014 | Ojiro et al. | |
| 8,885,216 B2 | 11/2014 | Ishitoya et al. | |
| 9,454,119 B2 | 9/2016 | Kuo | |
| 10,265,947 B2 | 4/2019 | Sumi | |

(Continued)

FOREIGN PATENT DOCUMENTS

| | | |
|---|---|---|
| CN | 105358326 A | 2/2016 |
| CN | 108367571 A | 8/2018 |

(Continued)

*Primary Examiner* — Bradley W Thies
(74) *Attorney, Agent, or Firm* — Jordan IP Law, LLC

(57) ABSTRACT

Certain examples relate to a method of a method of printing an image which comprises determining image data for an image to be printed onto a substrate, the image data comprising application amounts of one or more colorants to be applied to the substrate. A print mode is determined for applying the colorants to the substrate and comprises a plurality of application passes each for applying some of the application amounts of the colorants to the substrate and a drying delay between at least some of the application passes. The duration of the drying delay is dependent on a characteristic of one or more of the colorants or substrate. The image is printed using the image data and the print mode.

15 Claims, 5 Drawing Sheets

(56) References Cited

U.S. PATENT DOCUMENTS

| | | |
|---|---|---|
| 2009/0244125 A1 | 10/2009 | Ozaki et al. |
| 2014/0354749 A1 | 12/2014 | Garbacz et al. |
| 2016/0023472 A1 | 1/2016 | Arizono et al. |
| 2016/0109838 A1 | 4/2016 | Kuo |
| 2017/0165990 A1 | 6/2017 | Barkley et al. |
| 2020/0186677 A1 | 6/2020 | Morovic et al. |

FOREIGN PATENT DOCUMENTS

| | | |
|---|---|---|
| EP | 0913257 B1 | 1/2004 |
| EP | 3590723 A1 | 1/2020 |
| JP | 2009-234089 A | 10/2009 |
| JP | 5849469 B2 | 1/2016 |
| KR | 10-1503370 B1 | 3/2015 |
| WO | 96/23663 A1 | 8/1996 |
| WO | 2005/002863 A1 | 1/2005 |

* cited by examiner

PRINTING MODES WITH DRYING DELAYS

BACKGROUND

Color printing may result from a number of colorants of different colors being superimposed on top of a substrate, such as paper or other media. Since some printing technologies allow for a very small number of levels of inks to be deposited at a given location on a substrate, half-toning may be used to obtain ink patterns that result in a given color when seen from a suitable viewing distance. A printing system may be associated with a color space, defined by one or more colorants available to the printing system for deposition or application to a print medium. An example of a colorant color space is the Cyan, Magenta, Yellow, BlacK (CMYK) color space, wherein four variables are used in a subtractive color model to represent respective quantities of colorants. Examples of colorants include inks, dyes, pigments, paints, toners and powders.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
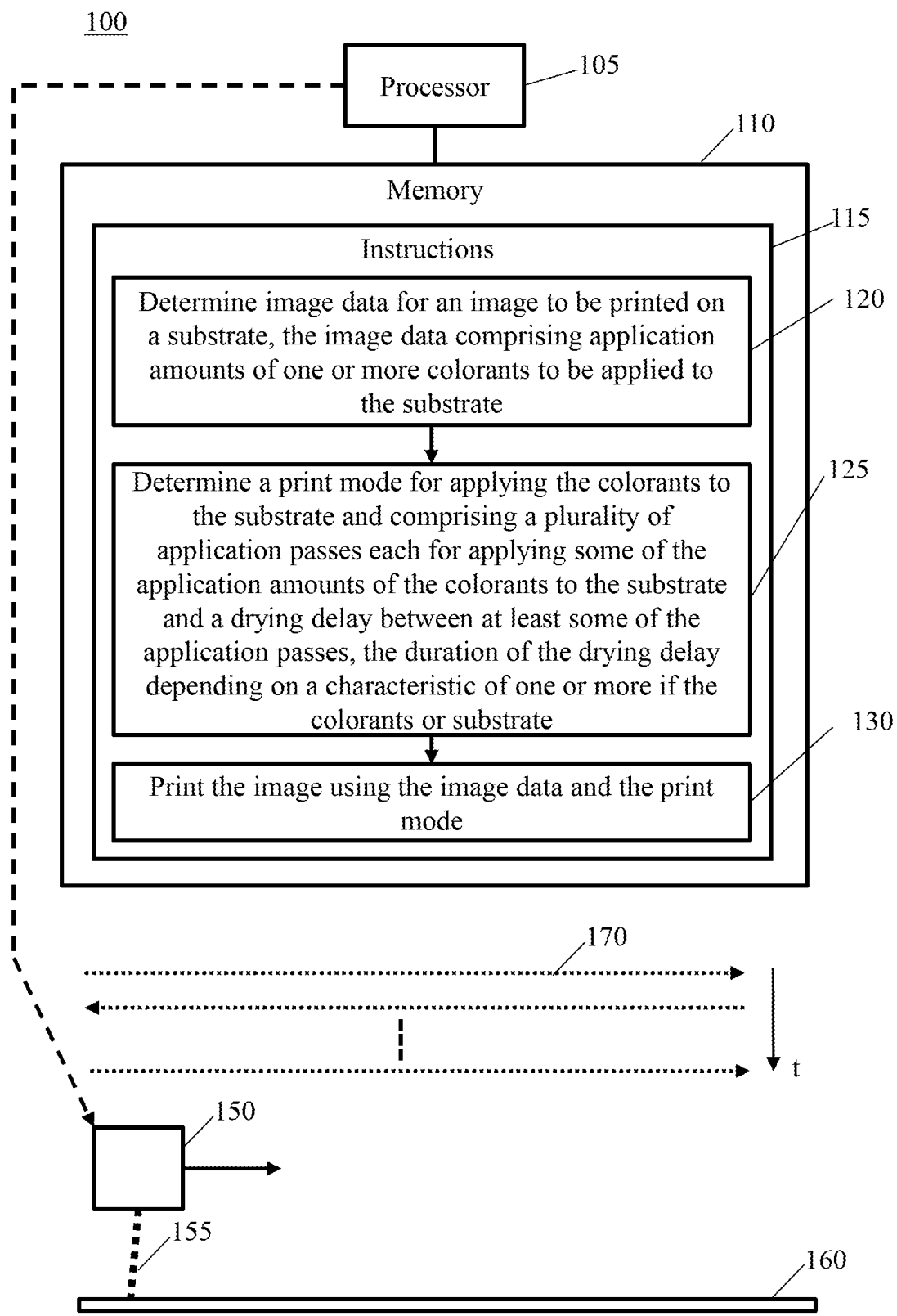
FIG. 1 is a schematic illustration of a printing apparatus according to an example.

Color can be represented within imaging devices such as print and display devices in a variety of ways. For example, in one case, a color as observed visually by an observer is defined with reference to a power or intensity spectrum of electromagnetic radiation across a range of visible wavelengths. In other cases, a color model is used to represent a color at a lower dimensionality. For example, certain color models make use of the fact that color may be seen as a subjective phenomenon, i.e. dependent on the make-up of the human eye and brain. In this case, a "color" may be defined as a category that is used to denote similar visual perceptions; two colors are said to be similar if they produce a similar effect on a group of one or more people. These categories can then be modelled using a lower number of variables.

Within this context, a color model may define a color space. A color space in this sense may be defined as a multi-dimensional space, with a point in the multi-dimensional space representing a color value and dimensions of the space representing variables within the color model. For example, in a Red, Green, Blue (RGB) color space, an additive color model defines three variables representing different quantities of red, green and blue light. In a digital model, values for these quantities may be defined with reference to a quantized set of values. For example, a color defined using an 8-bit RGB model may have three values stored in a memory, wherein each variable may be assigned a value between 0 and 255. Other color spaces include: a Cyan, Magenta, Yellow and Black (CMYK) color space, in which four variables are used in a subtractive color model to represent different quantities of colorant or printing fluid, e.g. for a printing system; the International Commission on Illumination (CIE) 1931 XYZ color space, in which three variables (X, Y and Z or tristimulus values) are used to model a color; the CIE 1976 (L*, a*, b*—CIELAB or 'LAB') color space, in which three variables represent lightness (L*) and opposing color dimensions (a* and b*); the YUV color space, in which three variables represent the luminance (Y) and two chrominance dimensions (U and V); and the IPT color space, in which the three variables represent a lightness or Intensity dimension (I), a "Protanopia" red-green chroma dimension (P), and a "Tritanopia" yellow-blue chroma dimension (T).

An image to be printed may be described by image data which may comprise a number of pixels or elements of the image which are each associated with a color value in a color space. The color values of the image data may need to be converted into a different color space specific to a printing apparatus for printing the image. For example, an image defined according to an RGB color space may need to be redefined in a CMYK color space corresponding to colorants available to the printing apparatus. A specific combination of colorants or inks to be printed may be specified as an ink-vector, which corresponds to the colorant amount per colorant for each pixel of an image to be printed.

Other color spaces include area coverage spaces, such as the Neugebauer Primary area coverage (NPac) color space. An NPac vector in the NPac color space represents a statistical distribution of Neugebauer Primaries (NPs) over an area of a halftone. In a simple binary (bi-level, i.e. two drop states: "drop" or "no drop") printer, an NP may be one of $2^k-1$ combinations of k printing fluids within the printing system, or an absence of printing fluid (resulting in $2^k$ NPs in total). An NP may thus be seen as a possible output state for a print-resolution area. The set of NPs may depend on an operating configuration of a device, such as a set of available colorants. A colorant or printing fluid combination as described herein may be formed of one or multiple colorants or printing fluids. For example, if a bi-level printing device uses CMY printing fluids there can be eight NPs or output states. These NPs relate to the following: C, M, Y, CM, CY, MY, CMY, and W (white or blank indicating an absence of printing fluid). An NP may comprise an overprint of a plurality of available printing fluids, such as a drop of magenta on a drop of cyan (for a bi-level printer) in a common addressable print area (e.g. a printable "pixel"). An NP may be referred to as a "pixel state".

An NPac space provides a large number of metamers. Metamerism is the existence of a multitude of combinations of reflectance and emission properties that result in the same perceived color for a fixed illuminant and observer. Multiple NPac vectors in an NPac space may have a similar colorimetry (e.g. a similar representation in a color space with three dimensions). Several NPac vectors may thus be useable to represent a given color. Different NPac vectors that have similar colorimetry may, however, have differing attributes or properties other than colorimetry (e.g. different appearances under different illuminants).

Each NPac vector may therefore define a probability distribution for colorant or printing fluid combinations for each pixel in the halftone (e.g. a likelihood that a particular colorant or printing fluid combination or available output state is to be placed or defined at each pixel location in the halftone). In this manner, a given NPac vector defines a set of halftone parameters that can be used in the halftoning process to map a color to NPs to be statistically distributed over the plurality of pixels for a halftone. Moreover, the statistical distribution of NPs to pixels in the halftone serves to control the colorimetry and other print characteristics of the halftone.

Spatial distribution of NPs according to the probability distribution specified in the NPac vector may be performed using a halftone method. Examples of suitable halftoning methods include matrix-selector-based Parallel Random Area Weighted Area Coverage Selection (PARAWACS) techniques and techniques based on error diffusion. An example of a printing pipeline that uses area coverage representations for halftone generation is a Halftone Area Neugebauer Separation (HANS) pipeline.

In multi-level printers, e.g. where print heads are able to deposit N drop levels, an NP may include one of $N^k-1$ combinations of k printing fluids, or an absence of printing fluid (resulting in $N^k$ NPs in total). A multi-level printer may use a piezo-electric or thermal print head that is capable of depositing different numbers of drops or different drop volumes, and/or may use multiple passes of a print head, to enact different drop states. For example, if a multi-level printer uses CMY printing fluids with four different drop states ("no drop", "one drop", "two drops" or "three drops"), available NPs can include C, CM, CMM, CMMM, etc. A "drop sequence" as used herein may define a set of drop states used or useable by a given printing system in a given operating state.

A simple color space may be defined using ink vectors which represent the proportion of individual inks within a combination such as an NPac vector. For example, an ink vector may be a vector with a predefined set of elements, where each element represents an ink (e.g. a colorant or color output available to the rendering device) and the value of the element represents a quantity of ink (e.g. [C, M, Y, K]). An ink vector may be used to instruct deposit of inks in a printing device, e.g. where the value represents a particular number of drops or quantity of ink to deposit. An ink vector may be used to instruct the printing of a color in an addressable area of a substrate (e.g. a print "pixel").

A colorant may be a dye, a pigment, an ink, or a combination of these materials. A substrate may include various types of paper, including matt and gloss, cardboard, textiles, plastics and other materials.

Certain examples described herein address a challenge with printing high amounts of colorants onto substrates such as paper, textiles, plastics and so on. Printing higher amounts of colorant increases the color gamut or ranges of colors that may be rendered by a printing apparatus. For example, darker colors can be made darker still be applying more colorant to the substrate. However, some substrates may become saturated when too much colorant is applied, resulting in visible artefacts such as bleeding of colors between neighboring parts of a print that use different colorant combinations, graininess, coalescence, mottle, cockle or even tearing of the substrate. Certain examples described herein allow additional colorant to be applied to substrates by introducing a delay between printing passes or applications of colorant. Colorant may be applied in a number of passes of a printhead or similar printing device across a substrate so that more colorant than can be applied in a single pass can be applied, for example to provide for a given gamut. By introducing a delay between some or all passes, more colorant can be applied to a substrate than would otherwise be the case. Because the color of the printed image depends on the interaction of the materials of the substrate and colorants, the duration of the delay can be adjusted depending on the substrate and/or colorants used. The absorptive capacity of a substrate may increase when it is (partially) dry compared with when it is "wet" with recently applied colorant. Similarly the tendency of a colorant to bleed beyond its applied position may vary depending on whether it is applied to substrate on which previously applied colorant has dried compared with previously applied colorant that is still wet.

FIG. 1 shows a printing apparatus 100 according to an example. The apparatus 100 comprises a processor 105 which is connectably coupled to a computer-readable memory 110 comprising a set of computer-readable instructions 115 stored thereon, which may be executed by the processor 105. The processor 105 may be arranged to control other components of the apparatus 100, including a print device 150 arranged to apply one or more colorants 155 to a substrate 160.

In an example, the print device 150 is a printhead having a plurality of inkjet nozzles for ejecting ink or other colorants onto the substrate to print an image according to image data received by the apparatus. The process of taking image data and processing this to generate print instructions for the print device 150 is called a print pipeline and an example is described below with respect to FIG. 2.

The printhead 150 is controlled by the processor 105 to move across the substrate 160 in a number of passes 170, where each pass may comprise a continuous movement in one direction across the width or length of the substrate. A subsequent pass may then move in the opposite direction across the substrate so that passes in alternating directions proceed over time as indicated. Alternatively the passes may move in just one direction at the end of which the printhead returns to its starting position for a new pass.

Colorant 155 may be applied to the substrate 160 during the passes such that the colorant is applied at locations along the pass corresponding to the image data in order to render a printed image. Such application passes, when colorant is applied to eth substrate, may immediately follow a previous application pass. However, some application passes will be followed by a drying delay before another application pass begins. This may be implemented by pausing movement of the printhead 150 and/or by continuing movement of the printhead but without applying colorant.

The computer-readable instructions 115 in the memory 110 may be used to implement the above described behavior. The memory may be a non-transitory computer-readable storage medium for example, a hard drive, a CD-ROM disc, a USB-drive, a solid-state drive or any other form of magnetic storage device, optical storage device, or flash memory device, maintained locally or accessed remotely, capable of having thereon computer readable code suitable for the functions described herein.

Instruction 120 instructs the processor to determine image data for an image to be printed on a substrate, where the image data comprises application amounts of one or more colorants to be applied to the substrate. The apparatus will receive source data corresponding to the image to be printed and will convert this into instructions for controlling the printhead 150. Conversion to image data may be implemented by a printing pipeline and includes amounts of colorant to be applied to the substrate. In an example this may take the form of drops of each color ink to be ejected onto the substrate at specified locations or pixels. Some drops of ink may be applied during different passes, for example two drops of one colored ink are needed in a pixel and the printhead can eject just one drop of a colorant at a time.

Instruction 125 instructs the processor 105 to determine a print mode for applying the colorants to the substrate 160. The or each print mode comprises a number of application passes which each apply some of eh application amounts of the colorants to the substrate. For example, where three drops of C ink are used at a given pixel, a bi-level printer which can apply one or zero drops of four CYMK colorants at a time, will use three application passes to eject all three drops of C onto the substrate. As noted above, drops of different colored ink or amounts of other types colorant may be combined to form a much wider range of printed colors. More drops of colorant will tend to result in darker or richer printed colors.

The print mode also comprises a drying delay between at least some of the application passes. As noted above, the drying delay may be implemented by pausing movement of a printhead or by using non-application passes where the printhead continues its previous movements but without applying colorant for at least one pass. Drying delays may be introduced between each application pass or between groups of application passes.

The duration of the drying delay is dependent on a characteristic of the substrate and/or a characteristic of one or more of the colorants. The characteristic may be a colorant substrate interaction such as colorant substrate penetration or colorant on substrate spreading. For example, a substrate comprised of a material having less absorptive capacity may need a longer drying duration than a different substrate comprised of a material having a greater absorptive capacity—such as gloss paper compared with un-calendared textile fabric. Similarly, a colorant having pigments and a carrier with a slow drying time may need a longer drying delay then those colorants which are quick drying. The drying delay may be dependent on the colorant having the characteristic normally causing the slowest drying time or greatest propensity to bleed. In an example, characterization of the drying delay is based on color measurement, that is measurement of the consequences of colorant and substrate characteristics by printing colorant combinations with varying degrees of drying delay and measuring the resulting color using a spectrophotometer, colorimetry or other measuring device. A plot of characteristics can then be generated, for example CIE $L^*$ (lightness), $C^*$ (chroma) and $h^*_{ab}$ versus drying delay time. This then allows a drying delay selection to be made that balances drying delay time with other factors such as additional reduction in printed brightness and/or increase in chroma and changes in hue. In an example a 5 unit increase in $C^*$ for 3 seconds delay may be selected over a 5.1 unit increase in $C^*$ for a 10 second delay. A user may select drying delay or print mode based on a tradeoff between printing speed and higher image quality.

The duration of the drying delay may also depend on other factors such as the amount of colorant to be applied, the print speed of the print device across the substrate, and the duty cycle of durations for drying delays compared to application passes—in other words whether the drying delays are introduced after each application pass or between every eight application passes.

Instruction 130 instructs the processor 105 to control the apparatus to print the image using the image data and the print mode. The processor 105 then controls the print device 150 and other components of the printing apparatus 100 to eject ink or other colorants onto the substrate in application passes across the substrate whilst also introducing drying delays between at least of those application passes.

The example allows more ink or other colorant to be applied to the substrate than would normally be absorbable, or absorbable without visible printing artifacts. The addition of one or more interswath delays allows the colorant to dry or partially dry before the next layer of colorant is applied. Increasing the amount of colorant than can be applied increases the gamut of the printing apparatus whilst maintaining image quality. This may be advantageous for higher end printing such as fine arts printing. Increased gamut allows higher contrast to be achieved and more vivid-looking printed images can be achieved with better color matching. Whilst the drying delays allow additional colorant to be applied whilst minimizing associated printing artefacts often introduced by additional colorant, the drying delays may also be applied without adding extra colorant. This may also help reduce printing artefacts such as bleeding, compared with not introducing drying delays.

The amount of additional colorant may be controlled according to the tone of the image pixel, as described in more detail below. For example, darker printed colors will benefit more than lighter printed colors which rely on lower amounts of colorant. Additional colorant may be applied in a non-linear manner such that for example lighter printed colors receive no additional colorant whilst dark printed colors receive significantly more colorant.

Figure 2:
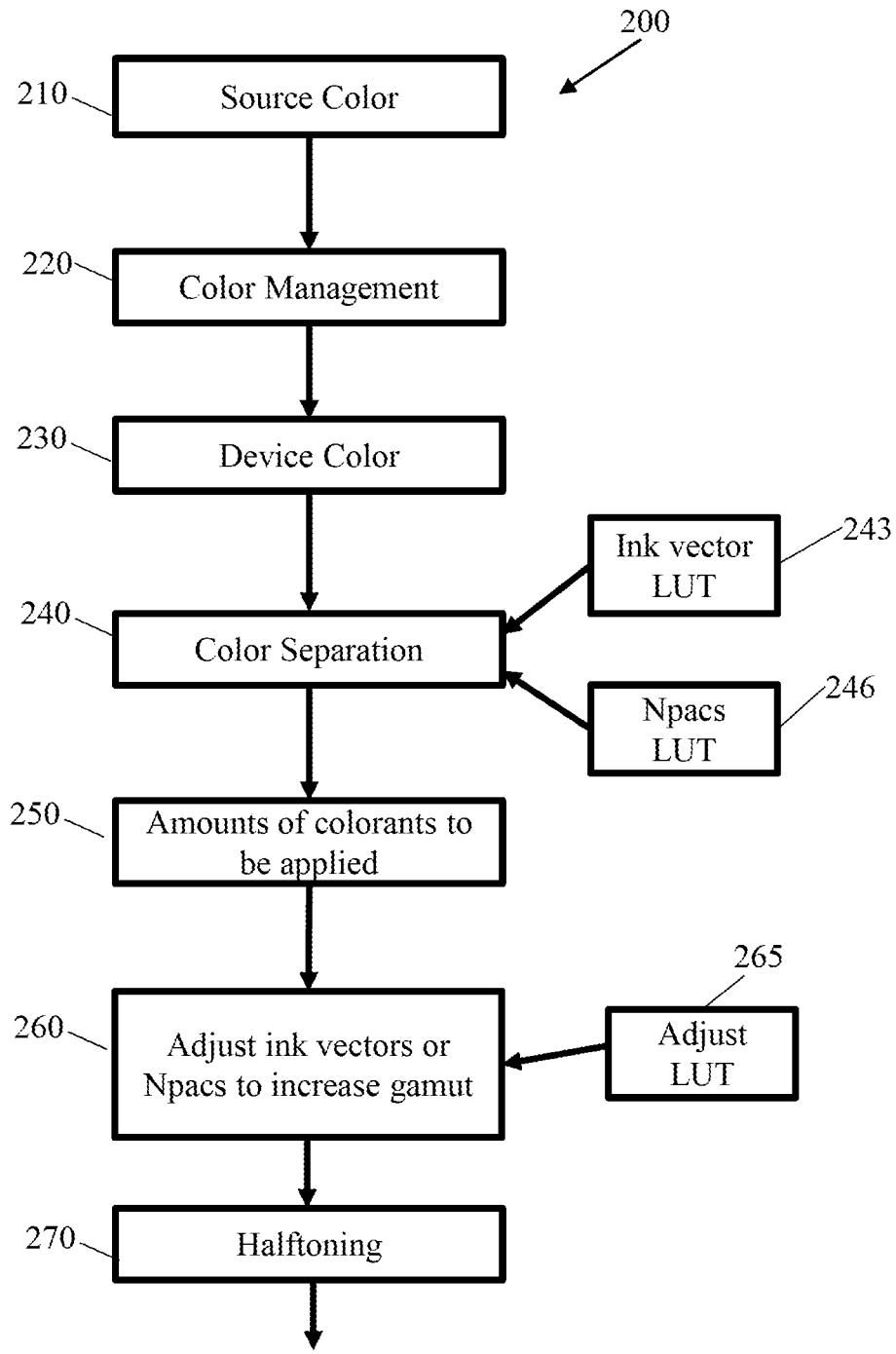
FIG. 2 is a schematic of a printing pipeline according to an example.

FIG. 2 illustrates a color printing pipeline according to an example. The pipeline 200 includes a color management stage 220 which receives a source file comprising image data in a source color space, for example CIE 1976. The color management stage 220 generates a device color output 230 corresponding to colors that the printer apparatus can actually render onto a substrate—for example the image data may be mapped from a RGB color space to a CMYK color space.

The device color output 230 can be processed by a color separation stage 240 that maps input from the device color output to amounts of colorants to be applied to the substrate for each pixel. In an example this can be represented by ink-vectors which may be mapped from the device colors using an ink-vector lookup table or LUT 243. The ink-vectors may be further mapped to NPac vectors by the color separation stage 240. NPacs may be calculated using linear programming or using an NPac LUT 246 in which the coverage of the colorants to be applied at each pixel is also specified. The amounts of colorant to be applied at each pixel may then be used as image data to determine the print mode to be used by a printing apparatus. This image data may be further processed into halftones before being used to apply colorants to the substrate.

In one example, the pipeline 200 may also comprises an adjustment stage 260 which increases the amount of ink to be applied to the substrate in order to increase the gamut of the printed image. The adjustment may be made per pixel dependent on the amount of colorant to be applied which may be determined from the ink-vector or using the coverage area of the NPac. For example, pixels with darker colors may be have their amount of colorant increase more than pixels with lighter colors. This adjustment may be implemented using an adjustment LUT 265.

This image data may then be further processed for example by a halftoning stage 270 before being used to control application of the colorants to a substrate.

Figure 3:
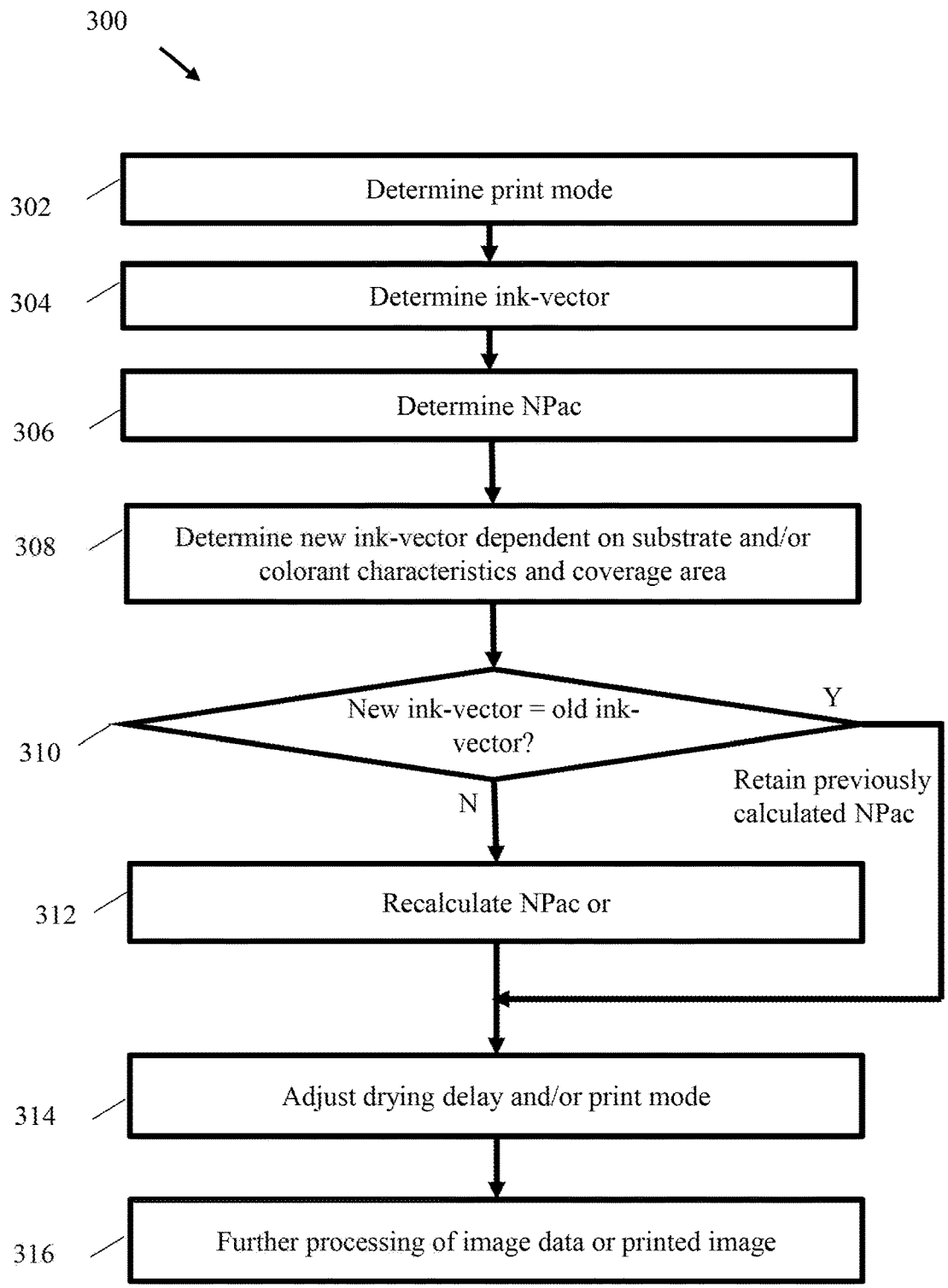
FIG. 3 is a flow chart showing a method of printing using a print mode with a drying delay and according to an example.

FIG. 3 illustrates a method of printing an image according to an example. The method 300 may be performed in association with apparatus 100 of FIG. 1 or elsewhere in any suitable color rendering system. Different parts of the method 300 may be performed by different components of a color rendering device. Parts of the method 300 may also be performed in a different order to that illustrated.

At block 302, the method 300 comprises determining a print mode to be used for printing an image. A print mode is the sequence of application passes for applying colorant to a substrate together with drying delays between some of the application passes.

Figure 4:
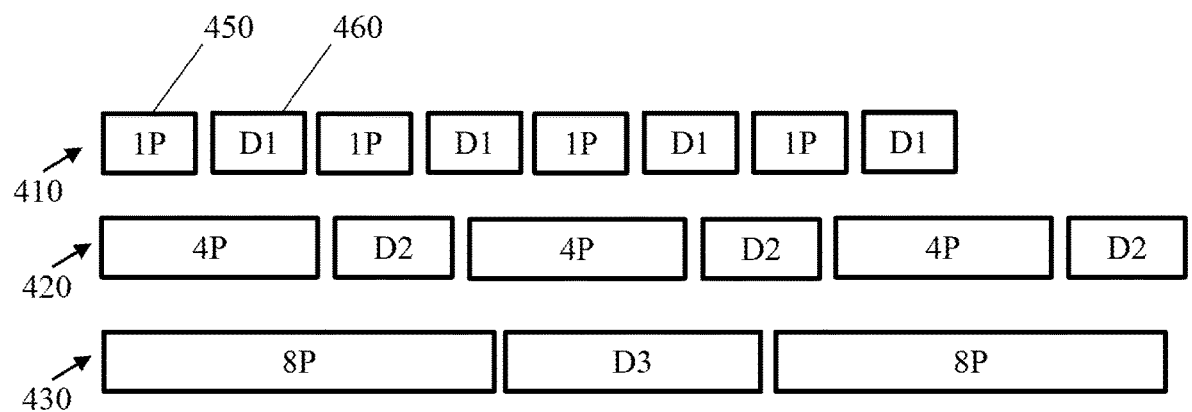
FIG. 4 is a schematic illustrating a number of print modes according to an example.

FIG. 4 illustrates three example print modes. In the first print mode 410, each application pass 1P 450 is followed by a drying delay D1 460 before another application single pass 1P commences. Each application pass 1P corresponds to movement of a print device to apply colorant to the substrate. Each drying delay D1 corresponds to a period when no colorant is applied to the substrate, allowing recently applied colorant to dry or partially dry. The drying delay D1 may be equal in duration to the duration of a single pass 1P or it may be different. The drying delay D1 may be dependent on a characteristic of the substrate and/or the colorants applied. The drying delay D1 may also depend on the amount of colorant to be added as well as the print speed of the application pass 1P. The drying delay D1 may change over time, for example increasing as more application passes are made.

In the second print mode 420, groups of four application passes 4P are performed before a drying delay D2. The drying delay D2 may be different from the drying delay D1 even for the same substrate and colorants. Other factors affecting the drying delay D2 are noted above with respect to drying delay D1.

In the third print mode 430, groups of eight application passes 8P are performed before a drying period D3 is introduced. Other variables may be introduced into the print modes for example multiple passes per swath or printing one (or a reduced number of) pass per swath to print the image then rewinding the substrate (or printhead) to start the next pass per swath until all passes per swath are completed. This means the drying delay between each pass of a swath corresponds to printing a pass of each swath of the substrate and may enable overall printing time to be reduced as the drying delay is incorporated as part of the overall printing process rather than being a "dead time" added to the process.

Returning to FIG. 3, at block 304 the method comprises determining ink-vectors for each pixel of an image to be printed. As noted with reference to FIG. 2, this may be implemented using an ink-vector LUT. In an example multi-level printing apparatus with CYMK colorants, the following ink-vector [2,3,1,0] corresponds to a pixel having 2 drops of cyan ink, 3 drops of yellow ink, 1 drop of magenta ink and no drops of black ink.

At block 306, the method 300 comprises calculating an NPac for each ink-vector. This may be achieved using an NPac LUT or a linear programming algorithm. The NPac represents the coverage over the pixel area of NPs made up of a combination of colorants. These NPac may be converted by a halftoning process into sub-pixels each assigned an NP. For example in a bi-level printing apparatus a pixel having an NPac vector [W 1/9; C 1/9; M 2/9; Y 0/9; CM 2/9; CY 1/9; MY 1/9; CMY 1/9] in a halftone having 3×3 sub-pixels (i.e. 9 sub-pixels for every pixel of the printed image), the resulting print output would have a halftone with one sub-pixel of White (W); one sub-pixel of Cyan (C); two sub-pixels of Magenta (M); no sub-pixels of Yellow (Y); two sub-pixels of Cyan+Magenta (CM); one sub-pixel of Cyan+Yellow (CY); one sub-pixel of Magenta+Yellow (MY); and one sub-pixel of Cyan+Magenta+Yellow (CMY). In an alternative example, the method may be a non-HANs pipeline just using ink-vectors or other mechanisms for applying colorant per pixel.

At block 308, the method 300 determines a new ink-vector dependent on a characteristic of the substrate and/or one or more of the colorants as well as the coverage area of the NPac. The coverage area corresponds to a desired gray level, shade tone or darkness of a color to be rendered in a pixel on the substrate. For example, a pixel having a low coverage area corresponds to a lighter color which may be rendered with lower amounts of one or more colorants compared with a pixel having a higher coverage area corresponding to a darker color using more colorant. In a non-HANs example, the combined amounts of the colorants may be used to determine a suitable metric to replace coverage area to determine the new ink-vector.

Block 308 may be implemented by applying a function f(t) such that:

$$\text{new\_ink-vector} = \text{original\_ink-vector} + f(t) * \text{original\_ink-vector}$$

The function f(t) applies a different proportion t of added colorant per pixel depending on the tone or coverage of the colorant to which it is applied. The increase in colorant may be linearly applied dependent on increasing coverage area or the increase in colorant may be non-linear and focused on darker colors. For example, for low coverage areas or tones there may be a 0% increase in colorant however for high coverage areas or darker tones colorant amounts may be increased in steps as the coverage area exceeds different thresholds, for example 0% increase in colorant up to 50% coverage area, then 50% increase between coverage area of 50%-70%, then 100% increase between coverage area of 70%-90% and finally a 150% increase in colorant above 90% coverage area. The use of print modes with drying delays allows the extra colorant to be absorbed by the substrate without introducing visible printing artifacts such as bleeding. However, the ability to accommodate additional colorant is affected by characteristics of the substrate and colorants. For example a glossy paper with low absorbency may be able to absorb an additional 50% of colorant even with low duration drying delays whereas a textile fabric may be able to absorb an additional 200% of colorant with suitable drying delays. The amount of additional colorant that may be accommodated by a substrate for a given combination of colorants may also depend on the print mode selected including the drying delay durations. In an example, determining a new ink-vector may be implemented using a predetermined lookup table (LUT).

The LUT can be determined by experiment in order to characterize the relationships between different substrates, colorants, colorant amounts and print modes including different combinations of passes of applying colorant and drying delays of different durations. Therefore at block 308, the method may consult the LUT using the following inputs: substrate type (which implies certain characteristics) or certain characteristics for the substrate used; colorant type or certain characteristics of the colorants used; print mode (which implies a combination of printing passes and drying delays of a certain duration in between); and coverage area, gray level or some other parameter corresponding to the initial amount of colorants. The LUT then returns a new ink-vector or other parameter corresponding to new amounts of colorants to be used. In order to increase the gamut of the printed image, the new amounts of colorants will be higher than the initial amounts of colorants but will be absorbable by the substrate using the selected print mode.

At block 310, the method 300 determines whether the new ink-vector is the same as the initial ink-vector, or is within a predetermined threshold of the initial ink-vector. If this is the case (Y), then the previously calculated NPac for the pixel is retained and the method moves to block 314. If the ink-vector has changed (N), then the method moves to block 312.

At block 312, a new NPac is calculated using the new ink-vector. This may be achieved using linear programming or any other suitable NPac calculation framework. Alternatively, where the new ink-vector is within a threshold distance of an original ink-vector, the NPac for that original ink-vector may be determined from the NPac LUT used in block 306.

At block 314, the method 300 may adjust the print mode depending on the changes in the NPacs or ink-vectors. For example, if a threshold number of NPacs have changed this is indicative of an image with generally richer or darker colors resulting in greater application of colorant compared with an image where few of the NPacs have changed indicating a generally lighter image. The duration of the drying delays may be extended for images having generally darker colors.

At block 318, the method 300 may further process the image data, such as halftoning. The method may also perform post-printing processes such as varnishing or calendaring.

Blocks 304 to 312 may be implemented using a predetermined LUT which returns an NPac for an input ink-vector and which already includes adjustments for the substrate and/or colorant characteristics as well as adjustments depending on the print mode and the amount of colorant to be applied, for example increasing colorant for darker colors but reducing or maintaining colorant amounts for lighter colors.

As already noted, the method may be applied to a HANS pipeline using NPacs as described or a non-HANS pipeline using ink-vectors. This may be also be implemented using calculations or by reference to a predetermined LUT.

Figure 5:
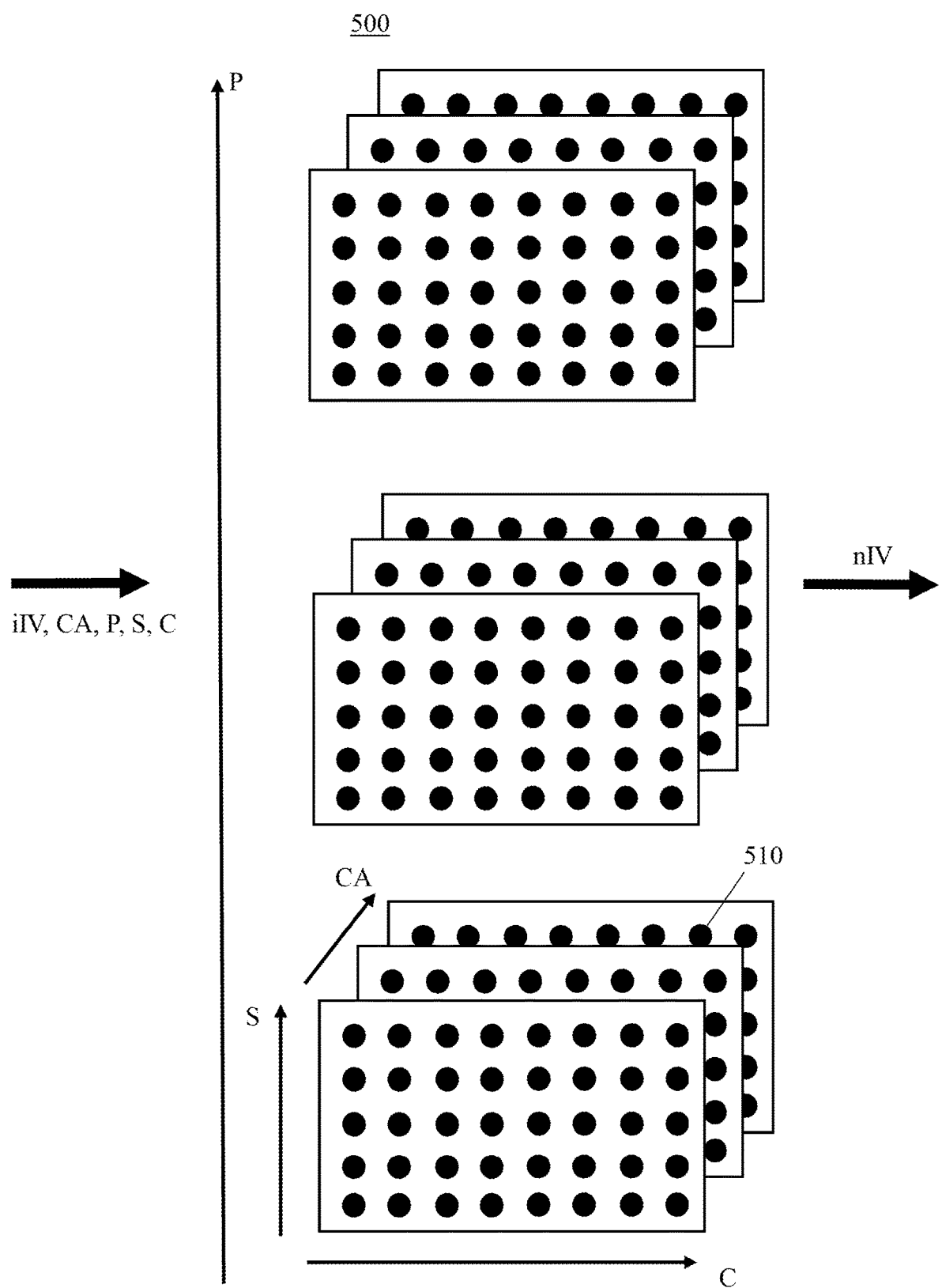
FIG. 5 illustrates a lookup table according to an example.

FIG. 5 illustrates a multi-dimensional matrix or LUT 500 which may be used in some examples. The LUT 500 includes nodes 510 corresponding to ink-vectors. The appropriate new ink-vector nIV to use will depend on the initial ink-vector iIV, a substrate characteristic S, a colorant characteristic C, a coverage area CA, and which print mode P is selected. The new ink-vector nIV may be determined by characterizing the ability of each substrate S to absorb additional amounts of colorant C in different print modes. The ability of adding colorant to enlarge gamut may be further characterized according to coverage area CA. This characterization may be performed by mathematical analysis or experimentation. In some examples additional dimensions may be added, for example additional substrate and/or colorant characteristics. Once the LUT 500 has been determined, it may be re-linearized using a color prediction model so that the nodes 510 are substantially equidistant.

Figure 6:
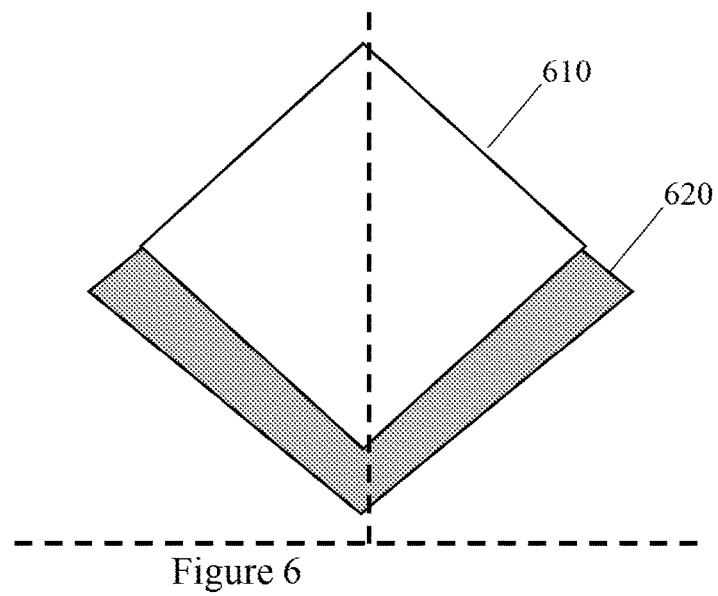
FIG. 6 illustrates an increase in gamut of a printing apparatus according to an example.

FIG. 6 illustrates an increase in gamut of a printing apparatus according to an example. The horizontal axis is CIE C* (chroma) and the vertical axis is CIE L* (lightness). The original color gamut 610 is expanded 620 by applying additional colorant. As can be seen this is most noticeable for darker colors. Lighter colors do not benefit from the addition of colorant and so the gamut is not expanded in this area. Therefore, the image quality consistent with the lower ink levels can be maintained. However higher levels of ink may be applied for darker colors to enlarge gamut whilst still maintaining reasonable image quality.

The examples allow the gamut of a printing apparatus to be enhanced whilst avoiding visible printing artifacts. This may be useful in some applications such as the printing of fine art prints, point-of-sale or point-of-purchase signage, posters and canvas prints for example.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples

What is claimed is:

1. A method comprising:
    determining image data for an image to be printed onto a substrate, the image data comprising application amounts of one or more colorants to be applied to the substrate;
    determining a print mode for applying the colorants to the substrate and comprising a plurality of application passes each for applying some of the application amounts of the colorants to the substrate and a drying delay between at least some of the application passes, wherein a duration of the drying delay is dependent on a characteristic of one or more of the colorants or substrate; and
    printing the image using the image data and the print mode.

2. The method of claim 1, wherein each said application pass corresponds to controlling movement of a print device to move relative to the substrate whilst applying some of the application amounts of colorant to the substrate, and wherein the drying delay corresponds to one or more of: pausing movement of the print device between at least two said application passes: controlling movement of the print device to move relative to the substrate without applying any colorant; and controlling movement of the print device to apply colorant to a different swath.

3. The method of claim 1, wherein characteristics of the one or more colorants or substrate comprises a colorant substrate interaction selected from one or more of the following: colorant substrate penetration; colorant on substrate spreading.

4. The method of claim 1, comprising increasing the application amounts of one or more colorants to increase the gamut of the printed image.

5. The method of claim 4, wherein the duration of the drying time is dependent on the increase in the application amounts of the one or more colorants.

6. The method of claim 4, wherein the increase in the application amounts of the one or more colorants is dependent on initial application amounts of the respective colorant.

7. The method of claim 6, comprising determining an ink-vector corresponding to the image data and increasing an amount of a colorant of the ink-vector dependent on a tone of the color in order to generate a new ink-vector to print the image.

8. The method of claim 7, comprising using a lookup table (LUT) to determine the new ink-vector, the new ink-vector being dependent on one or more of the following: the ink-vector corresponding to the image data; one or more colorant substrate interaction characteristics; an amount of colorant corresponding to the ink-vector; a tone of a color to be printed by the ink-vector.

9. The method of claim 7, comprising determining an NPac corresponding to the ink-vector and determining the new ink-vector dependent on a coverage area of the NPac.

10. A printing apparatus comprising:
a print device to print an image onto a substrate using a number of colorants;
a memory and a processor to:
determine image data corresponding to the image, the image data comprising application amounts of the colorants to be applied to the substrate in order to print the image;
determine a print mode for applying the colorants to the substrate according to the image data, the print mode comprising a plurality of application passes each for applying some of the application amounts of the colorants to the substrate and a drying delay between at least some of the application passes, wherein the duration of the delay is dependent on a characteristic of one or more of the colorants or substrate; and
control the print device to print the image using the image data and the print mode.

11. The printing apparatus of claim 10, comprising a print device to move relative to the substrate, the processor to:
control movement of the print device whilst applying some of the application amounts of colorant to the substrate to perform the application passes;
wherein the drying delay corresponds one or more of: pausing movement of the print device between at least two said application passes; control movement of the print device to move relative to the substrate without applying any colorant; and control movement of the print device to move relative to eh substrate in a different swath whilst applying colorant.

12. The printing apparatus of claim 10, wherein characteristics of the one or more colorants or substrate comprises a colorant substrate interaction selected from one or more of the following: colorant substrate penetration; colorant on substrate spreading.

13. The printing apparatus of claim 10, the processor to increase the application amounts of one or more colorants to increase the gamut of the printed image.

14. The printing apparatus of claim 13, wherein the duration of the drying time is dependent on the increase in the application amounts of the one or more colorants.

15. A non-transitory computer-readable storage medium comprising a set of computer-readable instructions that, when executed by a processor, cause the processor to:
determine image data for an image to be printed onto a substrate, the image data comprising application amounts of one or more colorants to be applied to the substrate;
determine a print mode for applying the colorants to the substrate and comprising a plurality of application passes each for applying some of the application amounts of the colorants to the substrate and a drying delay between at least some of the application passes, wherein the duration of the drying delay is dependent on a characteristic of one or more of the colorants or substrate.

* * * * *